United States Patent
Yin

(10) Patent No.: US 10,949,374 B2
(45) Date of Patent: Mar. 16, 2021

(54) TYPE-C INTERFACE CONTROLLING CIRCUIT, CONTROLLING METHOD AND MOBILE TERMINAL

(71) Applicant: VIVO MOBILE COMMUNICATION CO., LTD., Chang'an DongGuan (CN)

(72) Inventor: Quanxi Yin, Chang'an DongGuan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/486,782

(22) PCT Filed: Dec. 20, 2017

(86) PCT No.: PCT/CN2017/117459
§ 371 (c)(1),
(2) Date: Oct. 31, 2019

(87) PCT Pub. No.: WO2018/149224
PCT Pub. Date: Aug. 23, 2018

(65) Prior Publication Data
US 2020/0133908 A1  Apr. 30, 2020

(30) Foreign Application Priority Data
Feb. 16, 2017 (CN) .......................... 201710084863.5

(51) Int. Cl.
*G06F 13/40* (2006.01)
*G06F 13/42* (2006.01)
*G06F 13/38* (2006.01)

(52) U.S. Cl.
CPC ...... *G06F 13/4077* (2013.01); *G06F 13/4282* (2013.01); *G06F 13/385* (2013.01); *G06F 13/4022* (2013.01)

(58) Field of Classification Search
CPC ............... G06F 13/4077; G06F 13/385; G06F 13/4282; G06F 13/4022
See application file for complete search history.

(56) References Cited

U.S. PATENT DOCUMENTS

2016/0110305 A1* 4/2016 Hundal ................. G06F 13/387
710/316
2016/0112711 A1 4/2016 Hundal et al.
(Continued)

FOREIGN PATENT DOCUMENTS

CN 105677611 A 6/2016
CN 105847454 A 8/2016
(Continued)

OTHER PUBLICATIONS

Application No. 17896413.6—Extended European Search Report, dated Jan. 7, 2020.
(Continued)

*Primary Examiner* — Glenn A. Auve
(74) *Attorney, Agent, or Firm* — Getech Law LLC; Jun Ye

(57) ABSTRACT

The present disclosure provides a Type-C interface controlling circuit, a controlling method, and a mobile terminal, wherein the Type-C interface controlling circuit includes: a Type-C interface, a first transmission module, a second transmission module, a switching module, and a detection module. The first end of the detection module is connected to the Type-C interface for detecting a connection state of the Type-C interface, and the second end of the detection module is connected to the switching module, and the detection module controls a connection relationship between the first end of the switching module and the second end of the switching module according to the connection state.

9 Claims, 4 Drawing Sheets

(56) References Cited

U.S. PATENT DOCUMENTS

| | | | |
|---|---|---|---|
| 2016/0170932 A1 | 6/2016 | Lin | |
| 2017/0192923 A1* | 7/2017 | Liu | |
| 2017/0277650 A1* | 9/2017 | Zhao | G06F 13/385 |
| 2017/0286360 A1* | 10/2017 | Srivastava | G06F 13/385 |
| 2018/0027330 A1* | 1/2018 | Rand | H01R 29/00 |
| | | | 381/309 |
| 2018/0173661 A1* | 6/2018 | Rand | H04R 3/12 |
| 2019/0227973 A1* | 7/2019 | Bertin | G06F 13/4068 |

FOREIGN PATENT DOCUMENTS

| | | |
|---|---|---|
| CN | 105867874 A | 8/2016 |
| CN | 105872902 A | 8/2016 |
| CN | 105872903 A | 8/2016 |
| CN | 106021150 A | 10/2016 |
| CN | 106339337 A | 1/2017 |
| CN | 106874233 A | 6/2017 |
| EP | 2924584 A2 | 9/2015 |

OTHER PUBLICATIONS

Application No. PCT/CN2017/117459—International Preliminary Report on Patentability and Written Opinion of the International Searching Authority, dated Mar. 19, 2018, 16 pages. (with translation).

Application No. 201710084863.5—Office Action, dated Apr. 24, 2018, 11 pages. (with translation).

* cited by examiner

TYPE-C INTERFACE CONTROLLING CIRCUIT, CONTROLLING METHOD AND MOBILE TERMINAL

CROSS-REFERENCE TO RELATED APPLICATION

This application is the U.S. national phase of PCT Application No. PCT/CN2017/117459 filed on Dec. 20, 2017, which claims priority to Chinese Patent Application No. 201710084863.5 filed on Feb. 16, 2017, the disclosures of which are incorporated in their entirety by reference herein.

TECHNICAL FIELD

The present disclosure relates to the field of communication technology, and in particular to a Type-C interface controlling circuit, a controlling method, and a mobile terminal.

BACKGROUND

Type-C interface is one type of connection interface of the Universal Serial Bus (USB). It is more and more widely used in mobile terminals because it supports USB double-sided plugging. The Type-C interface defines various functions such as charging, data transmission, audio signal transmission, or display output. However, the Type-C interface in existing mobile terminals cannot simultaneously support multiple types of signal transmission. For example, when the mobile terminal is charged or transmits data, a headset thereof cannot be used to listen to or answer the call. It can be seen that the Type-C interface in existing mobile terminals cannot support different types of signal transmission at the same time.

SUMMARY

An embodiment of the present disclosure provides a Type-C interface controlling circuit, a controlling method, and a mobile terminal, so as to solve the problem that the Type-C interface of the existing mobile terminal cannot simultaneously support different types of signal transmission.

In a first aspect, an embodiment of the present disclosure provides a Type-C interface controlling circuit, including: a Type-C interface, including a first pin face and a second pin face which are symmetric, the first pin face and the second pin faces each include a multiplexed pin, and the multiplexed pin of each pin face is provided for transmitting at least two types of signals; a first transmission module configured to transmit a first type of signal; a second transmission a module configured to transmit a second type of signal; a switching module including a first switching unit and a second switching unit, a first end of the first switching unit is connected to the multiplexed pin of the first pin face, a second end of the first switching unit is connected to the first transmission module, a first end of the second switching unit is connected to a multiplexed pin of the second pin face, and a second end of the second switching unit is connected to the second transmission module; a detection module, a first end of the detection module is connected to the Type-C interface for detecting a connection state of the Type-C interface, and a second end of the detection module is connected to a switching module, the detection module controls a connection relationship between the first end of the switching module and the second end of the switching module according to the connection state.

In a second aspect, an embodiment of the present disclosure further provides a Type-C interface controlling method, which is applied to a Type-C interface having a multiplexed pin on each of the pin faces, and the Type-C interface is connected to a switching module. The method includes: detecting a connection state of the Type-C interface; controlling a connection relationship between the first end of the switching module and the second end of the switching module according to the connection state of the Type-C interface.

In a third aspect, an embodiment of the present disclosure further provides a mobile terminal, including a Type-C interface controlling circuit, the Type-C interface controlling circuit includes: a Type-C interface, including symmetric first pin face and second pin face, the first pin face and the second pin face each include a multiplexed pin, and the multiplexed pin of each pin face is used to transmit at least two types of signal; a first transmission module, configured to transmit a first type of signal; a second transmission module, configured to transmit a second type of signal; and a switching module, including a first switching unit and a second switching unit, the first end of the first switching unit is connected to a multiplexed pin of the first pin face, the second end of the first switching unit is connected to the first transmission module, and a first end of the second switching unit is connected to the second pin face, a second end of the second switching unit is connected to the second transmission module; a detection module, a first end of the detection module is connected to the Type-C interface to detect a connection state of the Type-C interface, the second end of the detection module is connected to the switching module, the detection module controls a connection relationship between the first end of the switching module and the second end the switching module according to the connection state.

In this way, an embodiment of the present disclosure transmits the connection state of the Type-C interface to the switching module by the detection module, and the switching module switches the switch to the corresponding channel according to the connection state, so that the first transmission module and the second transmission module can work simultaneously under different connection states of the Type-C interface.

BRIEF DESCRIPTION OF THE DRAWINGS

In order to more clearly illustrate the technical solutions of the embodiments of the present disclosure, the drawings used in the description of the embodiments of the present disclosure will be briefly described. It is obvious that the drawings in the following description are merely some embodiments of the present disclosure. Other drawings may also be obtained from those of ordinary skill in the art according to the drawings without paying creative labor.

DETAILED DESCRIPTION OF THE EMBODIMENTS

The technical solutions in the embodiments of the present disclosure are clearly and completely described in the following with reference to the accompanying drawings in the embodiments of the present disclosure. It is obvious that the described embodiments are a part of the embodiments of the present disclosure, and not all of the embodiments. Based on the embodiments of the present disclosure, all other embodiments obtained by a person of ordinary skill in the art without paying creative labor are the scope of the present disclosure.

Figure 1:
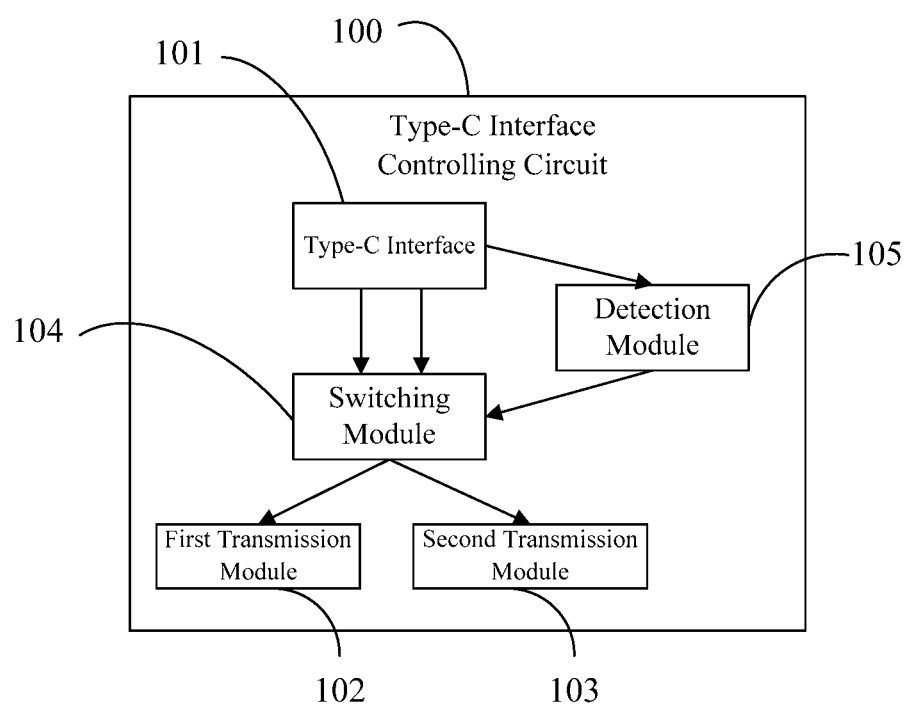
FIG. 1 is a structural diagram of a Type-C interface controlling circuit provided in some embodiments of the present disclosure.

FIG. 1 is a schematic structural diagram of a Type-C interface controlling circuit according to an embodiment of the present disclosure. As shown in FIG. 1, the Type-C interface controlling circuit 100 includes: a Type-C interface 101 comprising symmetrical first pin face and second pin face, the first pin face and the second pin face each comprise a multiplexed pin, the multiplexed pin of each pin face is configured to transmit at least two types of signal; a first transmission module 102 configured to transmit a first type of signal; a second transmission module 103 configured to transmit a second type of signal; and a switching module 104 including a first switching unit and a second switching unit, a first end of the first switching unit is connected to the multiplexed pin of the first pin face, and a second end of the first switching unit is connected to the first transmission module 102, and a first end of the second switching unit is connected to the multiplexed pin of the second pin face, a second end of the second switching unit is connected to the second transmission module 103; a detection module 105, a first end of the 105 of the detection module is connected to the Type-C interface 101 to detect a connection state of the Type-C interface 101, a second end of the detection module 105 is connected to the switching module 104 to control a connection relationship between the first end of the switching module 104 and the second end of the switching module 104 according to the connection state.

In an embodiment of the present disclosure, the Type-C interface 101 may include two symmetrical pin faces, for example, pin face A (or a first pin face) and pin face B (or a second pin) which are symmetric.

In an embodiment of the present disclosure, the first transmission module 102 may be configured for transmitting (including receiving and sending) a first type of signal, such as an audio analog signal; and the second transmission module 103 may be configured for transmitting (including receiving and sending) a second type of signal, for example, a signal transmitted via a USB data line.

In an embodiment of the present disclosure, the first end of the detection module 105 may be connected to a pin that indicates the connection state of the Type-C interface 101. Here, the connection state of the Type-C interface 101 may include a first connection state, for example, a state in which a USB data line connector is positively inserted to be connected to the Type-C interface 101 may be the first connection state; the connection state of the Type-C interface 101 may also include the second connection state, for example, a state in which a USB data line connector is reversely inserted to be connected to the Type-C interface 101 may be the second connection state.

The second end of the detection module 105 can be connected to the switching module 104, and can control the connection relationship between the first end of the switching module 104 and the second end of the switching module 104 according to the connection state of the Type-C interface 101 detected by the first end of the detection module 105.

For example, when the detection module 105 detects that the Type-C interface 101 is in the first connection state, the switching module 104 can enable a connection between the first end and the second end according to a first preset connection relationship; when the detection module 105 detects that the Type-C interface 101 is in the second connection state, the switching module 104 can enable the connection between the first end and the second end according to a second preset connection relationship.

The first preset connection relationship may be that the first end of the first switching unit of the switching module 104 is connected to the second end of the first switching unit, and the first end of the second switching unit of the switching module 104 is connected to the second end of the second switching unit; the second preset end connection relationship may be that the first end of the first switching unit of the switching module 104 is connected to the second end of the second switching unit, and the first end of the second switching unit of the switching module 104 is connected to the second end of the first switching unit.

Here, the connection relationship between the first end of the switching module 104 and the second end of the switching module 104 can be understood as a connection relationship between two modules (the first transmission module 102 and the second transmission module 103) and the multiplexed pins of the two pin faces of the Type-C interface 101.

As is well known, the Type-C interface 101 has functions such as USB double-sided plugging, pin multiplexing, etc., which enables the Type-C interface 101 to transmit different types of signal. Since the first transmission module 102 and the second transmission module 103 transmit different types of signal, corresponding transmission protocols are different. Therefore, in order to enable the Type-C interface 101 to simultaneously transmit the first and second types of signal in both connection states, it is necessary to change the connection relationship between the two modules (the first transmission module 102 and the second transmission module 103) and the multiplexed pins of the two pin faces of the Type-C interface 101 by switching the switching module 104.

Thus, in an embodiment of the present disclosure, since the detection module 105 can control the connection relationship between the first end of the switching module 104 and the second end of the switching module 104 according to the connection state of the Type-C interface 101, regardless of the connection state of the Type-C interface 101, it may be ensured that the first transmission module 102 can normally transmit the first type of signal, and the second transmission module 103 can normally transmit the second type of signal, so that the Type-C interface can simultaneously transmit two different types of signal.

Figure 2:
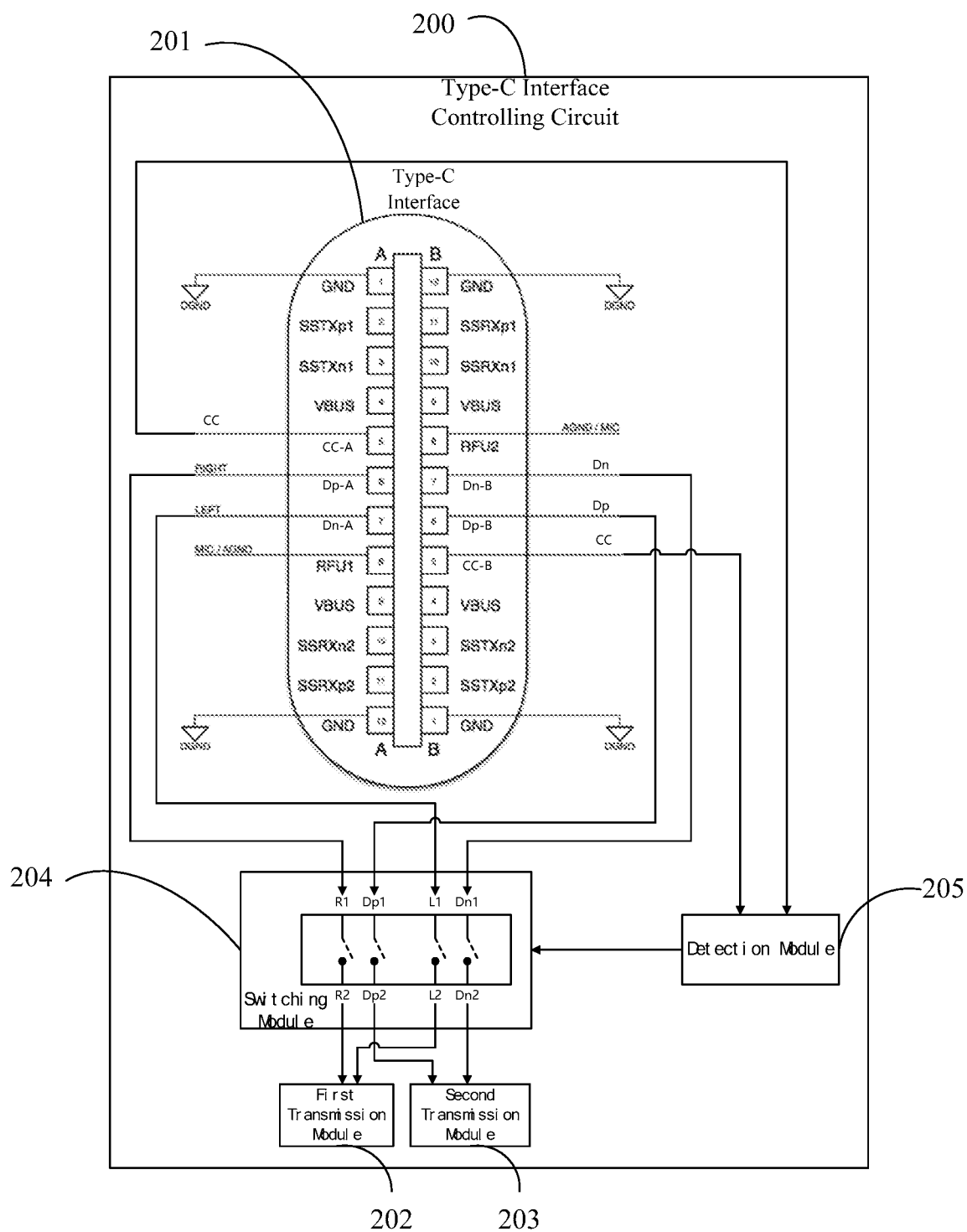
FIG. 2 is a structural diagram of a Type-C interface controlling circuit provided in some embodiments of the present disclosure.

In some optional embodiments, please refer to FIG. 2, FIG. 2 is a schematic structural diagram of a Type-C interface controlling circuit according to an embodiment of the present disclosure. As shown in FIG. 2, the Type-C interface controlling circuit 200 includes: a Type-C interface 201 including symmetric first pin face and second pin face, and the first pin face and the first pin face each include a multiplexed pin, and the multiplexed pin of each pin face is configured to transmit at least two types of signal; a first transmission module 202 configured to transmit the first type of signal; a second transmission module 203 configured to transmit the second type of signal; and a switching module 204 including the first switching unit and a second switching unit, the first end of the first switching unit is connected to the multiplexed pin of the first pin face, and the second end of the first switching unit is connected to the first transmission module 202, a first end of the second switching unit is connected to the multiplexed pin of the second pin face, and a second end of the second switching unit is connected to the second transmission module 203, and a detection module 205 configured to detect a connection state of the Type-C interface 201, the first end of the detection module 205 is connected to the Type-C interface 201 to detect the connection state of the Type-C interface 201, a second end of the detection module 205 is connected to the switching module 204. When the connection state of the Type-C interface 201 is a first connection state, the detection module 205 controls the first end of the first switching unit to be connected to the second end of the first switching unit, and controls the first end of the second switching unit is connected to the second end of the second switching unit; when the connection state of the Type-C interface 201 is a second connection state, the detection module 205 controls the first end of the first switching unit to be connected to the second end of the second switching unit, and controls the first end of the second switching unit is connected to the second end of the first switching unit.

In an embodiment of the present disclosure, the Type-C interface 201 may include a first pin face (for example, the A pin face in FIG. 2) and a second pin face (for example, the B pin face in FIG. 2) disposed symmetrically.

In an embodiment of the present disclosure, the first transmission module 202 may be configured for transmitting (including receiving and sending) a first type of signal, such as an audio analog signal; and the second transmission module 203 may be configured for transmitting (including receiving and sending) a second type of signal, for example, a signal transmitted via a USB data line.

In an embodiment of the present disclosure, the first end of the detection module 205 may be connected to a pin that indicates the connection state of the Type-C interface 201. Here, the connection state of the Type-C interface 201 may include a first connection state, a state in which a USB data line connector is positively inserted to be connected to the Type-C interface 101 may be the first connection state; the connection state of the Type-C interface 101 may also include the second connection state, for example, a state in which a USB data line connector is reversely inserted to be connected to the Type-C interface 101 may be the second connection state.

The second end of the detection module 205 can be connected to the switching module 204, and controls the connection relationship between the first end of the switching module 204 and the second end of the switching module 204 according to the connection state of the Type-C interface 201.

When the connection state of the Type-C interface 201 is the first connection state, the detection module 205 may control the first end of the first switching unit to be connected to the second end of the first switching unit, and control the first end of the second switching unit to be connected to the second end of the second switching unit; when the connection state of the Type-C interface 201 is the second connection state, the detection module 205 can control the first end of the first switching unit to be connected to the second end of the second switching unit, and control the first end of the second switching unit to be connected to the second end of the first switching unit.

In some optional embodiments, as shown in FIG. 2, the first pin face (A pin face) includes a first positive differential signal multiplexed pin (the sixth pin Dp-A of the A pin face) and a first negative differential signal multiplexed pin (the seventh pin Dn-A of the A pin face), and a second pin face (B pin face) including a second positive differential signal multiplexed pin (the sixth pin Dp-B of B pin face) and second negative differential signal multiplexed pin (the seventh pin Dn-B of B pin face); the first switching unit includes a first switch (switch R1-R2) and a second switch (switch L1-L2), the second switching unit includes a third switch (switch Dp1-Dp2) and a fourth switch (switch Dn1-Dn2); the first end of the first switch is connected to the first positive differential signal multiplexed pin (R1 is connected to sixth pin Dp-A of the A pin face), and the first end of the second switch is connected to the first negative differential signal multiplexed pin (L1 is connected to the seventh pin Dn-A of the A pin face), the first end of the third switch is connected to the second positive differential signal multiplexed pin (Dp1 is connected to the sixth pin Dp-B of the B pin face), the first end of the fourth switch is connected to the second negative differential signal multiplexed pin (Dn1 is connected to the seventh pin Dn-B of the B pin face).

Figure 3:
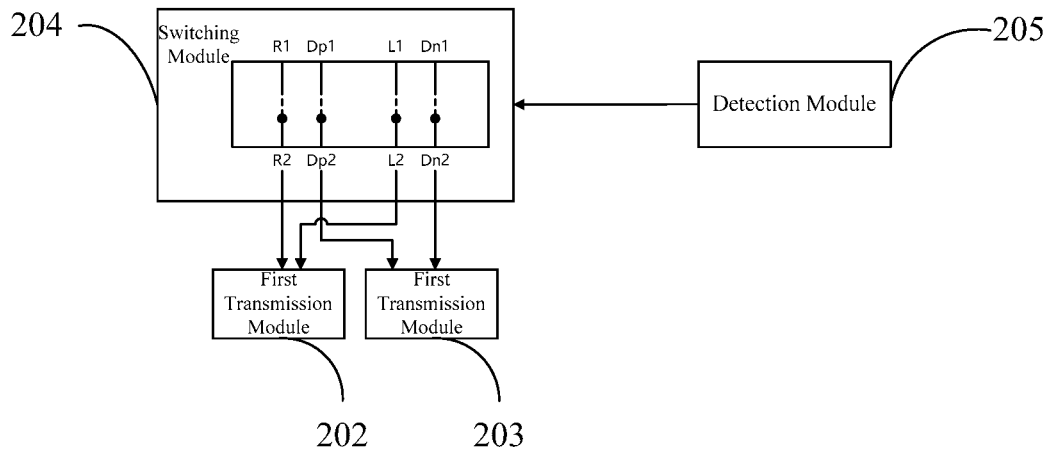
FIG. 3 is a structural diagram of a Type-C interface controlling circuit provided in some embodiments of the present disclosure.

As shown in FIG. 3, when the connection state of the Type-C interface is the first connection state, the first end of the first switch is connected to the second end of the first switch (R1 is connected to R2), and the first end of the second switch is connected to the second end of the second switch (L2 is connected to L2), a first end of the third switch is connected to a second end of the third switch (Dp1 is connected to Dp2), and a first end of the fourth switch is connected to a second end of the fourth switch (Dn1 is connected to Dn2).

Figure 4:
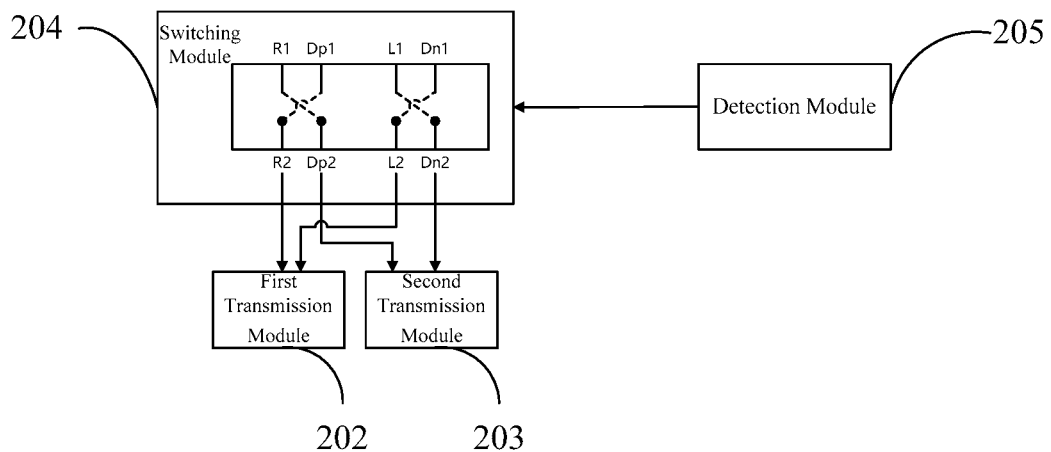
FIG. 4 is a structural diagram of a Type-C interface controlling circuit provided in some embodiments of the present disclosure.

As shown in FIG. 4, when the connection state of the Type-C interface is the second connection state, the first end of the first switch is connected to the second end of the third switch (R1 is connected to Dp2), and the first end of the second switch is connected to a second end of the fourth switch (L2 is connected to Dn2), a first end of the third switch is connected to the second end of the first switch (Dp1 is connected to R2), and a first end of the fourth switch is connected to the second end of the second switch (Dn1 connects to L2).

The Type-C interface of an embodiment of the present disclosure may be used to simultaneously transmit two different types of differential signal, and the first transmission module 202 may be a transmission module for transmitting a first type of differential signal, such as an audio analog differential signal or a USB digital differential. The second transmission module 203 may be a transmission module for transmitting a second type of differential signal, such as an audio analog differential signal or a USB digital differential signal.

In some optional embodiments, as shown in FIG. 2, the first pin face (A pin face) includes a first connecting pin (the fifth pin CC-A of the A pin face), and the second pin face (B pin face) includes a second connecting pin (the fifth pin CC-B of the B pin face), and the first end of the detection module 205 is connected to the first connecting pin and the second connecting pin; when the first end of the detection module 205 receives signal from the first connecting pin, the connection state of the Type-C interface 201 is the first connection state; when the first end of the detection module 205 receives signal from the second connecting pin, the connection state of the Type-C interface 201 is the second connection state.

In an embodiment of the present disclosure, the connection state of the Type-C interface 201 may be determined by one of the connecting pins of each of the pin faces of the Type-C interface 201.

In some optional embodiments, the first switch (switches R1-R2), the second switch (switches L1-L2), the third switch (switches Dp1-Dp2), and the fourth switch (switch Dn1-Dn2) are single pole double throw switch.

In some optional embodiments, the first transmission module 202 is an audio decoding module; the second transmission module 203 is a universal serial bus (USB) module.

In an embodiment of the present disclosure, when the first transmission module 202 is an audio decoding module and the second transmission module 203 is a universal serial bus USB module, the Type-C interface 201 can support listening to music (or calling) and charging (or transmitting data) simultaneously. In this way, a headphone interface provided on the mobile terminal can be replaced by the Type-C interface 201, that is, the Type-C interface 201 can function as both a USB data line interface and a headphone interface. Such interface multiplexing can improve integrity of a structure of the mobile terminal and can reduce failure probability to a certain extent.

In some optional embodiments, the audio decoding module includes a left channel decoding unit and a right channel decoding unit, and the left channel decoding unit and the right channel decoding unit are respectively connected to the second end (R2) of the first switch and a second end (L2) of the second switch.

In an embodiment of the present disclosure, the audio decoding module includes a left channel decoding unit and a right channel decoding unit, which provide a good audio effect output from the Type-C interface 201.

Thus, in an embodiment of the present disclosure, since the detection module 205 can control the connection relationship between the first end of the switching module 204 and the second end of the switching module 204 according to the connection state of the Type-C interface 201, regardless of the connection state of the Type-C interface 201, it can be ensured that the first transmission module 202 can normally transmit the first type of signal, and the second transmission module 203 can normally transmit the second type of signal, so that the Type-C interface can simultaneously transmit two different types of signal.

Figure 5:
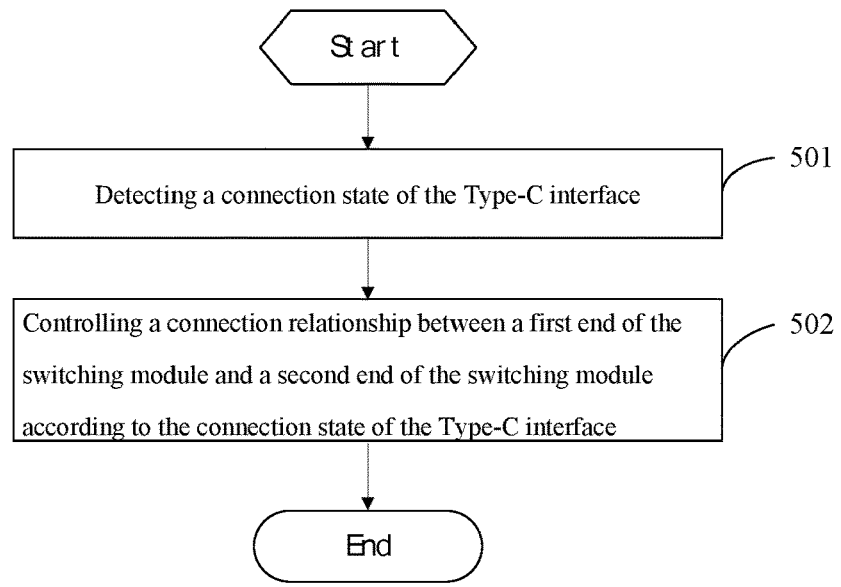
FIG. 5 is a flowchart of a Type-C interface controlling method provided in some embodiments of the present disclosure.

In some optional embodiments, please refer to FIG. 5. FIG. 5 is a schematic flowchart of a Type-C interface controlling method according to an embodiment of the present disclosure. As shown in FIG. 5, a Type-C interface controlling method is applied to a Type-C interface in which each pin face has a multiplexed pin, and the Type-C interface is connected to a switching module, and the method includes the following steps.

501. Detecting a connection state of the Type-C interface.

In this step, the detection module connected to the Type-C interface can detect the connection state of the Type-C interface, where the connection state can include the first connection state, for example, a state in which a USB data line connector is positively inserted to be connected to the Type-C interface 101 may be the first connection state; the connection state of the Type-C interface 101 may also include the second connection state, for example, a state in which a USB data line connector is reversely inserted to be connected to the Type-C interface 101 may be the second connection state.

502. Controlling a connection relationship between the first end of the switching module and the second end of the switching module according to a connection state of the Type-C interface.

In this step, the detection module connected to the Type-C interface can control the connection relationship between the first end of the switching module and the second end of the switching module according to the connection state of the Type-C interface.

Specifically, when the detection module detects that the Type-C interface is in the first connection state, the switching module can enable a connection between the first end and the second end according to a first preset connection relationship; when the detection module detects the Type-C interface is in the second connection state, the switching module can enable a connection between the first end and the second end according to a second preset connection relationship.

Specifically, the switching module includes a first switching unit and a second switching unit. Controlling the first end of the switching module and the second end of the switching module according to a connection state of the Type-C interface includes: when the connection state of the Type-C interface is the first connection state, controlling the first end of the first switching unit to be connected to the second end of the first switching unit, and controlling the first end of the second switching unit to be connected to the second end of the second switching unit; when the connection state of the Type-C interface is the second connection state, controlling the first end of the first switching unit to be connected to the a second end of the second switching unit, and controlling the first end of the second switching unit to be connected to the second end of the first switching unit.

In this way, in an embodiment of the present disclosure, since the detection module can control the connection relationship between the first end of the switching module and the second end of the switching module according to the connection state of the Type-C interface, regardless of the connection state of the Type-C interface, it can be ensured that the Type-C interface can simultaneously transmit two different types of signal to two different transmission modules.

Figure 6:
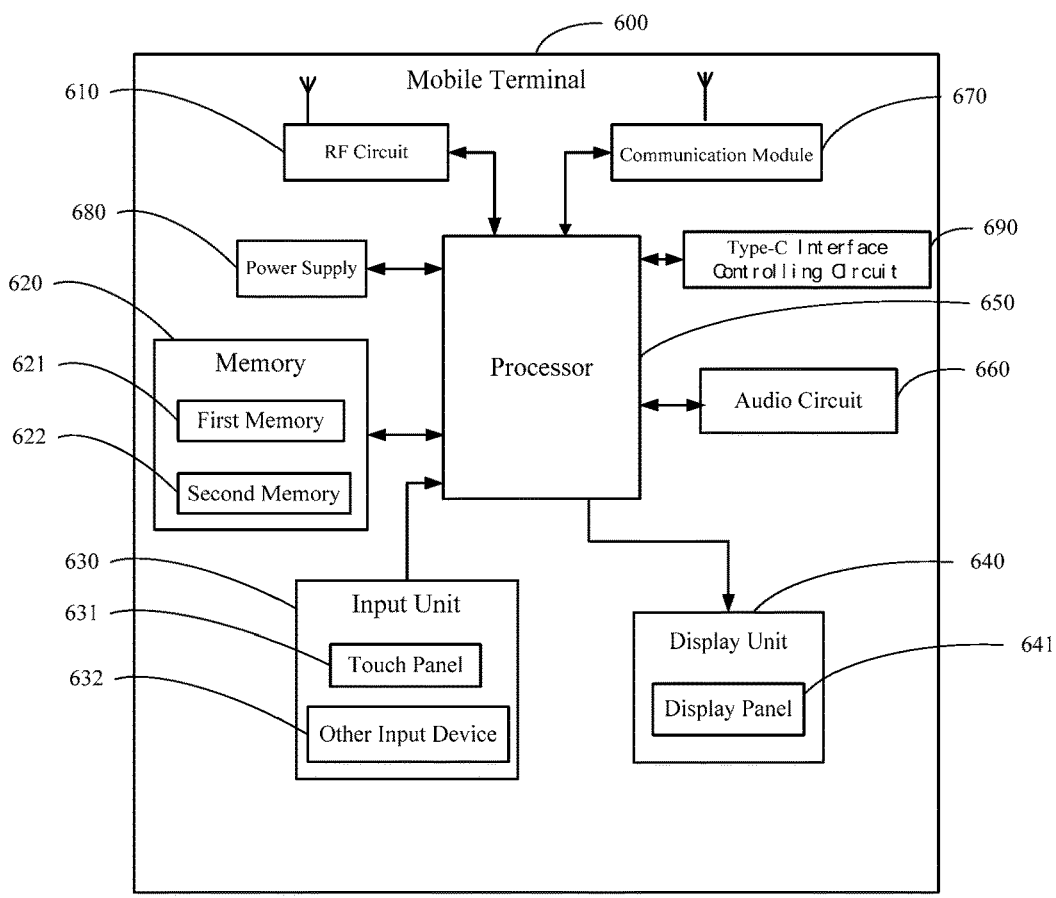
FIG. 6 is a structural diagram of a mobile terminal provided in some embodiments of the present disclosure.

In some alternative embodiments, please refer to FIG. 6, FIG. 6 is a structural diagram of a mobile terminal provided by an embodiment of the present disclosure. As shown in FIG. 6, the mobile terminal 600 includes a radio frequency (RF) circuit 610, a memory 620, an input unit 630, a display unit 640, a processor 650, an audio circuit 660, a communication module 670, a power supply 680, and a Type-C interface controlling circuit 690.

The Type-C interface controlling circuit includes: a Type-C interface, including symmetric first pin face and second pin face, wherein the first pin face and the second pin face respectively include multiplexed pin, the multiplexed pin is configured to transmit at least two types of signal; a first transmission module is configured to transmit a first type of signal; a second transmission module is configured to transmit a second type of signal; and the switching module includes a first a first switching unit and a second switching unit, the first end of the first switching unit is connected to the multiplexed pin of the first pin face, and the second end of the first switching unit is connected to the first transmission module, a first end of the second switching unit is connected to the multiplexed pin of the second pin face, a second end of the second switching unit is connected to the second transmission module, and a detection module, the second end of the detection module is connected to the Type-C interface to detect a connection state of the Type-C interface, a first end of the detection module is connected to the switching module, and the detection module controls the connection relationship between the first end of the switching module and the second end of the switching module according to the connection state.

In some optional embodiments, when the connection state of the Type-C interface is the first connection state, the detection module controls the first end of the first switching unit to be connected to a second end of the first switching unit, and controls the first end of the second switching unit to be connected to the second end of the second switching unit; when the connection state of the Type-C interface is the second connection state, the detection module controls the first end of a switching unit to be connected to a second end of the second switching unit, and controls a first end of the second switching unit to be connected to a second end of the first switching unit.

In some optional embodiments, the first pin face includes a first positive differential signal multiplexed pin and a first negative differential signal multiplexed pin, and the second pin face includes a second positive differential signal multiplexed pin and a second negative differential signal multiplexed pin; the first switching unit includes a first switch and a second switch, the second switching unit includes a third switch and a fourth switch; the first end of the first switch is connected to the first positive differential signal multiplexed pin, the first end of the second switch is connected to the first negative differential signal multiplexed pin, and the first end of the third switch is connected to the second positive differential signal multiplexed pin, the first end of the fourth switch is connected to the second negative differential signal multiplexed pin.

When the connection state of the Type-C interface is the first connection state, the first end of the first switch is connected to the second end of the first switch, and the first end of the second switch is connected to the second end of the second switch, the first end of the third switch is connected to the second end of the third switch, and the first end of the fourth switch is connected to the second end of the fourth switch.

When the connection state of the Type-C interface is the second connection state, the first end of the first switch is connected to the second end of the third switch, and the first end of the second switch is connected to the second end of the fourth switch, the first end of the third switch is connected to the second end of the first switch, and the first end of the fourth switch is connected to the second end of the second switch.

In some optional embodiments, the first pin face includes a first connecting pin, the second pin face includes a second connecting pin, and the first end of the detection module is connected to the first a connecting pin and the second connecting pin; when the first end of the detection module receives the signal from the first connecting pin, the connection state of the Type-C interface is the first connection state; when the first end of the detection module receives the signal from the second connecting pin, the connection state of the Type-C interface is the second connection state.

In some optional embodiments, the first switch, the second switch, the third switch, and the fourth switch are single pole double throw switches.

In some optional embodiments, the first transmission module is an audio decoding module; and the second transmission module is a universal serial bus (USB) module.

In some optional embodiments, the audio decoding module includes a left channel decoding unit and a right channel decoding unit, and the left channel decoding unit and the right channel decoding unit are respectively connected to the first switch and the second switch.

The input unit 630 can be configured to receive numeric or character information input by the user, and generate signal input related to user settings and function control of the mobile terminal 600. Specifically, in an embodiment of the present disclosure, the input unit 630 may include a touch panel 631. The touch panel 631, also referred to as a touch screen, can collect touch operations on or near a user (such as an operation of the user using a finger, a stylus, or the like on any suitable object or accessory on the touch panel 631), and drives the corresponding connection device according to the preset programmed program. In some optional embodiments, the touch panel 631 can include two portions, i.e., a touch detection device and a touch controller. Wherein, the touch detection device detects touch orientation of the user, and detects signal brought by touch operation, and transmits the signal to the touch controller; the touch controller receives the touch information from the touch detection device, converts the touch information into contact coordinates, sends to the processor 650, and can receive commands from the processor 650 and execute them. Further, the touch panel 631 can be implemented in various types such as resistive, capacitive, infrared, and surface acoustic waves. In addition to the touch panel 631, the input unit 630 may further include other input devices 632, which may include, but are not limited to, one or more of physical keyboards, function keys (such as volume control buttons, switch buttons, etc.), trackballs, mice, joysticks, and the like.

The display unit 640 can be used to display information input by the user or information provided to the user and various menu interfaces of the mobile terminal 600. The display unit 640 can include a display panel 641. In some optional embodiments, the display panel 641 can be configured in the form of an LCD or an Organic Light-Emitting Diode (OLED).

It should be noted that the touch panel 631 can cover the display panel 641 to form a touch display screen, and when the touch display screen detects a touch operation on or near it, it is transmitted to the processor 650 to determine a type of touch event, and then the processor 650 provides a corresponding visual output on the touch display depending on the type of touch event.

The touch display screen includes an application interface display area and a common control display area. An arrangement manner of the application interface display area and the display area of the common control is not limited, and the arrangement manner of the two display areas can be distinguished by up-and-down arrangement, left-right arrangement, and the like. The application interface display area can be used to display the interface of the application. Each interface can contain interface elements such as at least one application icon and/or widget desktop control. The application interface display area can also be an empty interface that does not contain any content. The common control display area is used to display controls with high usage, such as setting buttons, interface numbers, scroll bars, phone book icons, and the like.

The processor 650 is a control center of the mobile terminal 600, and connects various parts of the entire mobile phone by using various interfaces and lines, thereby performing overall monitoring of the mobile terminal 600 by running or executing software programs and/or modules stored in the first memory 621, calling data in the second memory 622, and performing various functions of the mobile terminal 600 and processing data. In some alternative embodiments, the processor 650 can include one or more processing units.

In an embodiment of the present disclosure, the mobile terminal may be a mobile phone, a tablet personal computer, a laptop computer, a personal digital assistant (PDA), and a mobile Internet access device (MID) or a wearable device with a Type-C interface, and so on.

The above is only the specific embodiment of the present disclosure, but the scope of the present disclosure is not limited thereto, and changes or substitutions that any person skilled in the art can easily think of within the technical scope of the disclosure should be included within the scope of protection of the present disclosure. Therefore, the scope of protection of the present disclosure should be determined by the scope of the claims.

What is claimed is:

1. A USB Type-C® interface controlling circuit comprising:
   a USB Type-C® interface comprising a first pin face and a second pin face which are symmetric, wherein the first pin face and the second pin face each comprises a multiplexed pin, and the multiplexed pin of each pin face is provided for transmitting at least two types of signals;
   a first transmission module, configured to transmit a first type of signal;
   a second transmission module, configured to transmit a second type of signal;
   a switching module comprising a first switching unit and a second switching unit, a first end of the first switching unit is connected to the multiplexed pin of the first pin face, and a second end of the first switching unit is connected to the first transmission module, and a first end of the second switching unit is connected to the multiplexed pin of the second pin face, and a second end of the second switching unit is connected to the second transmission module;
   a detection module, a first end of the detection module is connected to the USB Type-C® interface for detecting a connection state of the USB Type-C® interface, and a second end of the detection module is connected to the switching module, and the detection module controls a connection relationship between a first end of the switching module and a second end of the switching module according to the connection state, wherein
   when the connection state of the USB Type-C® interface is a first connection state, the detection module controls the first end of the first switching unit to be connected to the second end of the first switching unit, and controls the second end of the second switching unit to be connected to the second end of the second switching unit;
   when the connection state of the USB Type-C® interface is a second connection state, the detection module controls the first end of the first switching unit to be connected to the second end of the second switching unit, and controls the first end of the second switching unit to be connected to the second end of the first switching unit.

2. The USB Type-C® interface controlling circuit according to claim 1, wherein the first pin face includes a first positive differential signal multiplexed pin and a first negative differential signal multiplexed pin, and the second pin face includes a second positive differential signal multiplexed pin and a second negative differential signal multiplexed pin;
   the first switching unit includes a first switch and a second switch, the second switching unit includes a third switch and a fourth switch; a first end of the first switch is connected to the first positive differential signal multiplexed pin, a first end of the second switch is connected to the first negative differential signal multiplexed pin, a first end of the third switch is connected to the second positive differential signal multiplexed pin, and the first end of the fourth switch is connected to the second negative differential signal multiplexed pin;
   when the connection state of the USB Type-C® interface is the first connection state, the first end of the first switch is connected to the second end of the third switch, and the first end of the second switch is connected to the second end of the second switch, the first end of the third switch is connected to the second end of the third switch, and the first end of the fourth switch is connected to the second end of the fourth switch;
   when the connection state of the USB Type-C® interface is the second connection state, the first end of the first switch is connected to the second end of the third switch, and the first end of the second switch is connected to the second end of the fourth switch, the first end of the third switch is connected to the second end of the first switch, and the first end of the fourth switch is connected to the second end of the second switch.

3. The USB Type-C® interface controlling circuit according to claim 2, wherein the first pin face comprises a first connecting pin, the second pin face comprises a second connecting pin, the first end of the detection module is connected to the first connecting pin and the second connecting pin;
   when the first end of the detection module receives signals from the first connecting pin, the connection state of the USB Type-C® interface is the first connection state;
   when the first end of the detection module receives signals from the second connecting pin, the connection state of the USB Type-C® interface is the second connection state.

4. The USB Type-C® interface controlling circuit according to claim 2, wherein the first switch, the second switch, the third switch, and the fourth switch are single pole double throw switches.

5. The USB Type-C® interface controlling circuit according to claim 2, wherein the first transmission module is an audio decoding module;
   the second transmission module is a universal serial bus (USB) module.

6. The USB Type-C® interface controlling circuit according to claim 5, wherein the audio decoding module comprises a left channel decoding unit and a right channel decoding unit, the left channel decoding unit and the right channel decoding unit are respectively connected to the first switch and the second switch.

7. The USB Type-C® interface controlling circuit according to claim 1, wherein the first pin face comprises a first connecting pin, the second pin face comprises a second connecting pin, the first end of the detection module is connected to the first connecting pin and the second connecting pin;

when the first end of the detection module receives signals from the first connecting pin, the connection state of the USB Type-C® interface is the first connection state;

when the first end of the detection module receives signals from the second connecting pin, the connection state of the USB Type-C® interface is the second connection state.

8. A mobile terminal, comprising the USB Type-C® interface controlling circuit according to claim 1.

9. A USB Type-C® interface controlling method applied to a USB Type-C® interface having a multiplexed pin on each pin face being connected to a switching module, the method comprising:

detecting a connection state of the USB Type-C® interface; and controlling a connection relationship between a first end of the switching module and a second end of the switching module according to the connection state of the USB Type-C® interface, wherein the switching module comprises a first switching unit and a second switching unit;

the step of controlling the connection relationship between a first end of the switching module and a second end of the switching module according to the connection state of the USB Type-C® interface comprises:

when the connection state of the USB Type-C® interface is a first connection state, controlling a first end of the first switching unit to be connected to a unit to be connected to a second end of the second switching unit;

when the connection state of the USB Type-C® interface is a second connection state, controlling the first end of the first switching unit to be connected to the second end of the second switching unit, and controlling the first end of the second switching unit to be connected to the second end of the first switching unit.

* * * * *